Oct. 1, 1963  F. FIKENSCHER  3,105,469
ROTATING REGENERATIVE AIR PREHEATER FOR EXCESSIVE AIR HEATING
Original Filed Aug. 7, 1952

INVENTOR

BY

ATTORNEY 3,105,469
ROTATING REGENERATIVE AIR PREHEATER
FOR EXCESSIVE AIR HEATING
Friedrich Fikenscher, Gummersbach, Rhineland, Germany, assignor to L. & C. Steinmiller G.m.b.H., Gummersbach, Rhineland, Germany, a German firm
Original application Aug. 7, 1952, Ser. No. 303,066, now Patent No. 2,913,228, dated Nov. 17, 1959. Divided and this application Aug. 18, 1959, Ser. No. 834,588
Claims priority, application Germany Aug. 21, 1951
2 Claims. (Cl. 122—480)

This application is a division of my copending application Serial No. 303,066, filed August 7, 1952, now Patent No. 2,913,228, dated November 17, 1959, and entitled "Rotating Regenerative Air Preheater for Excessive Air Heating."

An object of the invention is to provide an assembly for effecting a space saving and cost saving arrangement of heating surfaces making it possible to achieve simultaneously adequate steam superheating as well as the particularly high temperature of the preheated combustion air by means of one measure and the same already with the starting of the boiler and at a light boiler load.

This object is of especial importance for dust fired boiler plants which, as is frequently the situation in European countries, must utilize difficult fuels. This is due to the fact that for their operating requirements, a good superheating, which with a weak load can only be obtained at considerable expense as is well known, together with a high air heating, as otherwise the ignition and combustion of the coal dust flame is not assured.

Another object of the invention is to provide a practical combination of a simultaneous connection in parallel of heating surfaces of the air preheater, the overheater and the heat exchanger, such as a preliminary evaporator without noticeable want of space or expense.

Figure 1:
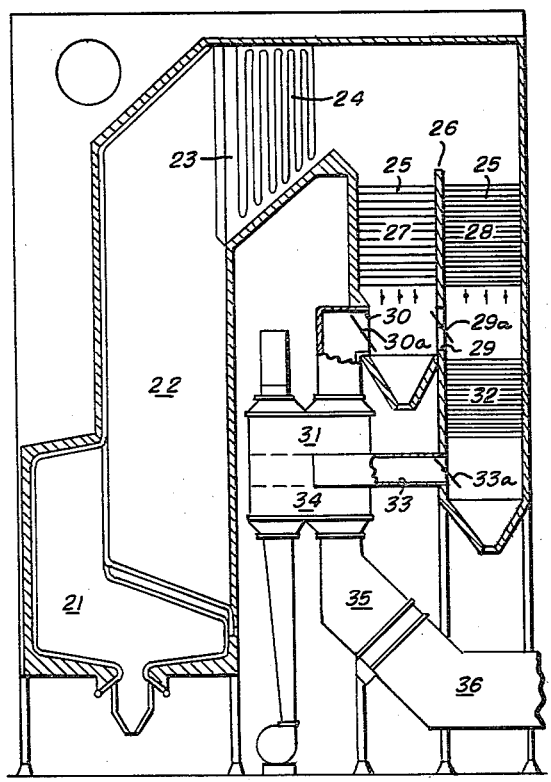
Figure 2:
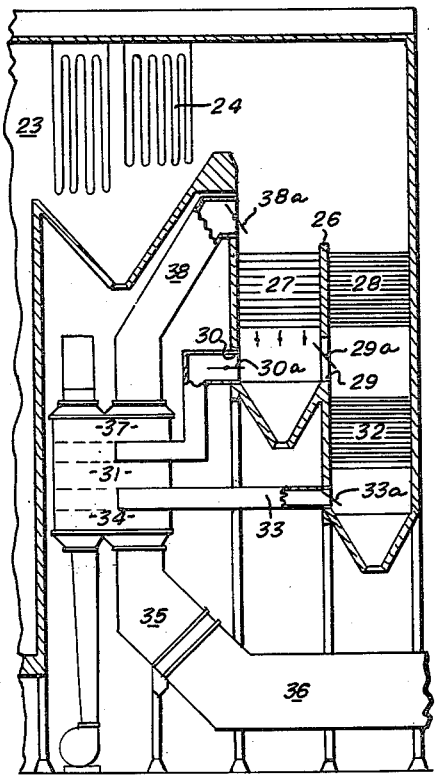

Other objects and advantages will become apparent by reference to the following description and annexed drawings, and in which drawings:

FIG. 1 is an elevational view, partly in cross-section of a melting boiler embodying the present invention, and, FIG. 2 is a view similar to FIG. 1, of another form, with the melting chamber being omitted.

As shown in FIG. 1, the combustion gases produced in a melting chamber 21 enter a radiation space 22, and are cooled to a temperature which is necessary and allowable at the entrance into a foremost group 24 of superheaters depending vertically in a horizontally disposed gas vent means 23. Adjacent the gas vent means 23 is provided a vertically disposed gas vent means 25 which is sub-divided by a partition wall 26 which separates a group of superheaters 27 from a heat exchanger, such as a group of preliminary evaporators or feed water preheaters 28, and the respective groups are connected in parallel at the side of the furnace gases.

At the lower end of the partition wall 26 and behind the two groups 27 and 28, there is provided a short-circuit opening 29 controlled by a suitable valve means 29a, and an inlet opening 30 likewise controlled by suitable valve means, such as throttle valves 30a. The inlet opening 30 communicates with a first air preheater stage 31, and the size of the openings 29 and 30 can be adjusted by the manipulation of the respective valve means.

Below the heat exchanger 28, there is located a second heat exchanger, such as preliminary evaporator or feed water preheater 32 which communicates with a second air preheating stage 34 by means of a channel or conduit 33, and the inlet of the channel is provided with valve means, such as throttle valve 33a.

The furnace gases leave the boiler plant through a dust removal unit 35, and a flue 36 located behind the second air preheater stage 34.

The first air preheating stage, at the side of the furnace gases may follow selectively to the superheater group 27 or to the heat exchanger 28, or to both groups, simultaneously whereby a simple arrangement exists to influence the temperature of the superheated material. Subsequently, and essentially parallel to the first air preheater stage 31, a further portion of the gases passes the second preliminary evaporator or feed water preheater 32, and thereafter unites or joins with first portion of the gases by passing through the conduit 33, and entering the second air preheating stage 34. If the conduit is closed by the valve means 33a, and the heat exchanger 32 consequently inactive, the feed water is less preheated or preliminarily evaporated in favor of the steam superheating and the air preheating, and least of all, if additionally, the opening 29 is closed by its valve means 29a, since then only the superheater and the air preheater are heated. Of course, the gases escape through the unit 35 and the flue 36.

In FIG. 2, there is shown an arrangement in which the vapor and air temperature and the regulating range may be obtained, especially with a small load. In this embodiment, the furnace gases, in case of necessity without passing through the group 27 may be used only for an increased air heating by the assistance of an additional third air preheating stage 37 communicating with the vent means 25 through a channel or conduit 38 provided with throttle valve means 38a.

If the danger of corrosion is feared, when starting, due to the temperature in the air preheater group being below the dew point, this danger can be avoided by providing a short-circuit channel or conduit between the conduit 33 and the dust removal unit 35, with such short-circuit channel being connected in parallel to the air preheater group 34.

The special advantage of the invention lies substantially in the fact that, without noticeable increase of space and cost, a simple means is provided to increase the air preheating over the normal amount and, independently thereof, to overheat the steam in the desired degree corresponding to that with normal load, and to control the preheating or overheating at will. Such operations were very difficult up to the present invention, especially with small load and during starting, and could only be performed imperfectly. By means of the arrangement of the heating surfaces according to the invention, it is now possible to keep, when starting, only the air at a high temperature and moreover, with small load, also to keep the temperature of the superheated steam at the height required by the power engine driven thereby, without influencing the firing and with the possibility of facilitating the firing with respect to ignition and combustion. Simultaneously the fluidity of the slag is considerably increased in furnaces in which the slags are drawn in a liquid state, also with very small loads.

It is to be understood that the notation heat exchangers as applied to the components 28 and 32 has reference to preliminary evaporators or economizers (feed water preheaters). The invention is not to be confined to any strict conformity to the drawings, but changes or modifications may be made therein, so long as such changes or modifications mark no material departure from the spirit and scope of the appended claims.

I claim:

1. In a steam boiler, a housing, conduit means within the housing providing a flow path for flue gases, means for introducing flue gases into the conduit means, a first superheater means arranged in the conduit means adapted to be swept by the gases introduced into the conduit means, partition means in the conduit means downstream of the first superheater means dividing the conduit means into two parallel ducts, a second superheater means in one of said ducts, a heat exchanger in the other of said ducts, first valve means operably associated with the outlet ends of said parallel ducts for controlling gas flow through said ducts, a second heat exchanger in the conduit means downstream of the first heat exchanger, a casing within said housing, at least two rotor elements in the casing spaced from one another and constituting hot and cold stages of a rotatable regenerative air preheater, said casing having inlets and outlets for the flue gases and air, respectively, first channel means between the ducts containing the second superheater means and the first heat exchanger and the gas inlet of the casing for conducting the flue gases leaving said ducts to the rotor element constituting the hot stage of the preheater, second valve means in the first channel means for controlling gas flow to the rotor element constituting the hot stage of the preheater, second channel means between conduit means containing the second heat exchanger and the space between said rotor elements of the air preheater, third valve means arranged in the second channel means for controlling gas flow from the conduit means containing the second heat exchanger into the space between the rotor elements, and further conduit means communicating with the rotor element constituting the cold stage of the air preheater for discharging the entire quantity of flue gases entering said conduit means.

2. The steam boiler as claimed in claim 1, further including a third rotor element upstream of the rotor element defining the hot stage and constituting a hotter stage, means for supplying a portion of the gases leaving said first-named superheater means to such third rotor element upstream of said second superheater, and valve means for controlling gas flow through said supplying means.

References Cited in the file of this patent
UNITED STATES PATENTS

| | | |
|---|---|---|
| 2,207,497 | Mayo | July 9, 1940 |
| 2,320,911 | Cooper | June 1, 1943 |
| 2,594,471 | Marshall | Apr. 29, 1952 |